United States Patent [19]
Hasegawa et al.

[11] Patent Number: 6,054,498
[45] Date of Patent: Apr. 25, 2000

[54] SHORT CIRCUIT-RESISTANT POLYETHYLENE MICROPOROUS FILM

[75] Inventors: Takuya Hasegawa; Takahiko Kondo, both of Yokohama, Japan

[73] Assignee: Asahi Kasei Kogyo Kabushiki Kaisha, Osaka, Japan

[21] Appl. No.: 09/091,737

[22] PCT Filed: Dec. 25, 1996

[86] PCT No.: PCT/JP96/03783

§ 371 Date: Jun. 24, 1998

§ 102(e) Date: Jun. 24, 1998

[87] PCT Pub. No.: WO97/23554

PCT Pub. Date: Jul. 3, 1997

[30] Foreign Application Priority Data

Dec. 25, 1995 [JP] Japan ................................ 7-349997

[51] Int. Cl.[7] ....................................................... C08J 9/28

[52] U.S. Cl. ............................. 521/64; 521/142; 521/143; 429/247; 526/352

[58] Field of Search ........................... 429/247; 526/352; 521/64, 142, 143

[56] References Cited

U.S. PATENT DOCUMENTS

| | | | |
|---|---|---|---|
| 4,959,396 | 9/1990 | Yankov et al. | 521/61 |
| 5,340,840 | 8/1994 | Park et al. | 521/60 |
| 5,422,377 | 6/1995 | Aubert | 521/64 |
| 5,667,911 | 9/1997 | Yu et al. | 429/144 |

*Primary Examiner*—John M. Cooney, Jr.
*Attorney, Agent, or Firm*—Birch, Stewart, Kolasch, & Birch, LLP

[57] ABSTRACT

A microporous film comprising a high-density polyethylene and a linear copolymer polyethylene and having a terminal vinyl group concentration of 2 or more per 10,000 carbon atoms in the polyethylene, as measured by an infrared spectroscopic method.

9 Claims, No Drawings

SHORT CIRCUIT-RESISTANT POLYETHYLENE MICROPOROUS FILM

This application is the national phase under 35 U.S.C. §371 of prior PCT International Application No., PCT/JP96/03783, which has an International filing date of Dec. 25, 1996, which designated the United States of America, the entire contents of which are hereby incorporated by reference.

TECHNICAL FIELD

The present invention relates to a polyethylene microporous film, a separator comprising the film, and a battery made using the separator.

BACKGROUND ART

Polyethylene microporous films are used as microfiltration membranes, separators for batteries, separators for condensers, etc. Among these uses, when polyethylene microporous films are used as battery separators, especially as separators for lithium ion batteries, they are required to have a so-called "fuse effect" which is a property that when the insides of the batteries are overheated, the separator becomes molten and forms a coat which covers the electrode to break the current, thereby securing the safety of batteries. In addition, general properties such as mechanical strength and permeability are necessary.

It is known that the fuse temperature of polyethylene microporous films, namely, the temperature at which the fuse effect is developed, is about 130–150° C. Even if the inside of battery is overheated for some reason, when the temperature reaches the fuse temperature, the microporous film melts to form a coating which covers the electrodes, and, hence, the ionic flow is interrupted to stop the battery reaction. However, when the temperature very abruptly rises, the temperature inside the battery further rises even after the fuse occurs, and consequently said coat is broken, which causes a short in the battery. Separators having such a high short resistance, which can surely continue to break the current even under the above-mentioned circumstances, are in demand.

The object of the present invention is to provide a polyethylene microporous film excellent in mechanical strength, permeability and productivity, and high in short resistance.

As a result of intensive research conducted by the inventors, it has been found that a polyethylene microporous film comprising a specific high-density polyethylene or linear copolymer polyethylene has a high short resistance, and the present invention has been accomplished.

DISCLOSURE OF INVENTION

A first embodiment of the present invention is a microporous film comprising a high-density polyethylene or linear copolymer polyethylene having a terminal vinyl group concentration of 2 or more per 10,000 carbon atoms in the polyethylene as determined by an infrared spectroscopic method. A preferred first embodiment of the present invention is a microporous film comprising a high-density polyethylene or linear copolymer polyethylene having a terminal vinyl group concentration of preferably 5 or more, more preferably 6 or more per 10,000 carbon atoms in the polyethylene as determined by an infrared spectroscopic method.

A second embodiment of the present invention is the microporous film of the first embodiment in which the weight-average molecular weight of the high-density polyethylene or linear copolymer polyethylene is 200,000–1,000,000.

A third embodiment of the present invention is a separator comprising the above microporous film.

A fourth embodiment of the present invention is a battery made using the above separator.

BEST MODE FOR CARRYING OUT THE INVENTION

The polyethylene used in the present invention (hereinafter referred to as "P-HDPE") can be fixed by the concentration of terminal vinyl group. The terminal vinyl group concentration of P-HDPE is 2 or more, preferably 5 or more, more preferably 6 or more per 10,000 carbon atoms in the polyethylene. Such a polyethylene can be produced by carrying out suspension polymerization, solution polymerization or gas phase polymerization using a chromium compound-supporting catalyst in combination with an organo-metallic compound disclosed, for example, in JP-B-1-12777.

It is not clear why P-HDPE has a high short resistance, but it is considered that short resistance, as evaluated by an overcharge test or washer test, can be greatly improved by using P-HDPE in place of ordinary HDPE having a terminal vinyl group concentration of less than 2 per 10,000 carbon atoms in the polyethylene (hereinafter referred to as "Z-HDPE"). The term "washer" test here means a test for the simple evaluation of short resistance by observing the occurrence of breakage in a film when the film in a constrained state is instantaneously heated to higher than its melting point and by measuring the time before the occurrence of the breakage. This test can perform a satisfactory evaluation of the possibility of the occurrence of shorting at the portions where the pressure of the electrode applied to separator is low, such as the portions around electrode tab and side faces of rectangular batteries.

The P-HDPE is basically a polymer mainly composed of ethylene units (high-density polyethylene), but may be a copolymer (linear copolymer polyethylene) containing α-olefin unit such as propylene, butene, pentene, hexene, octene or the like in an amount of 4 mol % or less based on the ethylene unit for lowering the fuse temperature.

The density of P-HDPE is 0.90–0.98, preferably 0.93–0.97, more preferably 0.94–0.96. If the density is lower than 0.90, it is difficult to make the film porous.

The weight-average molecular weight of P-HDPE is 100,000–3,000,000, preferably 200,000–1,000,000. If the molecular weight is less than 100,000, the strength of the microporous film is insufficient, and if the molecular weight is more than 3,000,000, the viscosity of the (co)polymer is too high and molding of the (co)polymer is difficult. If necessary, the molecular weight distribution of the (co)polymer may be broadened by means of a double-stage polymerization or blending.

In the present invention, P-HDPE may be blended with a high-density polyethylene having a terminal vinyl group concentration of less than 2 per 10,000 carbon atoms in polyethylene, namely, the above-mentioned Z-HDPE, as far as the terminal vinyl group concentration is not outside the range of the present invention. Z-HDPE can be produced by carrying out polymerization using a Ziegler catalyst containing a magnesium compound disclosed in, for example, JP-B-1-12777. The density of Z-HDPE is 0.90–0.98, preferably 0.93–0.97, more preferably 0.94–0.96. Z-HDPE may also be a copolymer containing α-olefin units such as propylene, butene, pentene, hexene, octene or the like for lowering the fuse temperature, as far as the effect of the present invention is not damaged. The weight-average molecular weight of Z-HDPE is 100,000–3,000,000, preferably 200,000–1,000,000. If the molecular weight is less than 100,000, the strength of the microporous film is insufficient, and if the molecular weight is more than 3,000,000, the viscosity of the (co)polymer is too high and molding of the (co)polymer is difficult. If necessary, the molecular weight distribution of the (co)polymer may be broadened by means of a double-stage polymerization or blending.

Furthermore, P-HDPE may be blended with a poly-α-olefin such as low-density polyethylene, polypropylene, polymethylpentene, ethylene-propylene copolymer or the like, as far as the effect of the present invention is not damaged.

Next, a process for producing the polyethylene microporous film of the present invention will be explained.

The polyethylene microporous film is produced by dissolving a polyethylene in a solvent called a plasticizer at a temperature higher than the melting point of the polyethylene, cooling the resulting solution to lower than the crystallization temperature to form a polymer gel, thereby forming a film (film forming step), stretching the resultant film (stretching step), and then removing the plasticizer (plasticizer removing step).

The term "plasticizer" here means an organic compound capable of forming a homogeneous solution with a polyethylene at a temperature lower than its boiling point. Examples of the plasticizer include decalin, xylene, dioctyl phthalate, dibutyl phthalate, stearyl alcohol, oleyl alcohol, decyl alcohol, nonyl alcohol, diphenyl ether, n-decane, n-dodecane, and paraffin oil. Among them, paraffin oil, dioctyl phthalate, and decalin are preferred. The proportion of the plasticizer in the polymer gel is not especially limited, but is usually 20–90%, preferably 50–70%. If the proportion of the plasticizer is less than 20%, it is difficult to obtain a microporous film having a suitable porosity, and if it is more than 90%, the viscosity of the hot solution decreases making it difficult to perform continuous molding into a sheet.

The process for producing the polyethylene microporous film will be explained below for the film forming step, stretching step, and plasticizer removing step, separately.

[Film forming step]

The film forming step is not limited, and, for example, a polyethylene powder and a plasticizer are fed to an extruder, melt kneaded at about 200° C., and then cast on a cooling roll from a customary coat hanger die, whereby a sheet of several tens of $\mu$m to several mm can be continuously formed.

Since being different from conventional techniques, ultra-high-molecular-weight polyethylene is not used as an essential component in the practice of the present invention, special heating and dissolving apparatuses are not needed and a uniform sheet can be very simply prepared only by feeding polyethylene and plasticizer to an extruder.

[Stretching step]

The resulting sheet is then stretched at least in a mono-axial direction to make a stretched film. The stretching method is not limited, and a tentering method, roll method, calendering method, etc. can be used. Among these methods, simultaneous biaxial stretching by a tentering method is preferred. The stretching temperature is from room temperature to the melting point of the polymer gel, preferably 80–130° C., more preferably 100–125° C. The stretching ratio in terms of area is 4–400 times, preferably 8–200 times, more preferably 16–100 times. If the stretching ratio is less than 4 times, the strength is insufficient as a separator, and if it is more than 400 times, not only is stretching difficult, but also the porosity of the resulting microporous film is small.

[Plasticizer removing step]

Then, the plasticizer is removed from the stretched film to obtain a microporous film. The method for removal of the plasticizer is not limited. For example, when paraffin oil or dioctyl phthalate is used as the plasticizer, it may be extracted with an organic solvent such as methylene chloride, methyl ethyl ketone or the like, and the plasticizer can be more sufficiently removed by heating and drying the resulting microporous film at a temperature lower than its fuse temperature. Moreover, when a low boiling point compound such as decalin is used as the plasticizer, the plasticizer can be removed by merely heating and drying at a temperature lower than the fuse temperature of the microporous film. In either case, it is preferred to remove the plasticizer with the film being in a constrained state, for example, by fixing it, in order to inhibit a deterioration in properties caused by shrinking of the film.

If necessary, to improve permeability or increase dimensional stability, the microporous film obtained by the above-mentioned process is subjected to heat treatment at a temperature lower than the fuse temperature.

[Properties]

The thickness of the microporous film is 1–500 $\mu$m, preferably 10–200 $\mu$m, more preferably 15–50 $\mu$m. If the thickness is less than 1 $\mu$m, the mechanical strength of the film is insufficient, and if it is more than 500 $\mu$m, miniaturization and weight-saving to batteries are hindered.

The pore diameter of the pores in the microporous film is 0.001–0.3 $\mu$m, preferably 0.005–0.1 $\mu$m, more preferably 0.01–0.05 $\mu$m. If the pore diameter is less than 0.001 $\mu$m, permeability is insufficient, and if it is more than 0.3 $\mu$m, breaking of current due to fuse effect is delayed and, besides, a short-circuit caused by precipitated dendrite or collapsed active material may occur. Therefore, films having such pores are not suitable for the use as battery separators.

As explained in detail hereinbefore, the polyethylene microporous film of the present invention has a high short resistance, and the short resistance can be further improved by adopting measures such as increasing the temperature of the resin before casting, increasing the stretching temperature, reducing the polymer concentration, and increasing the terminal vinyl group concentration.

Furthermore, in order to exhibit the short resistance at its maximum, it is preferred to decrease the fuse temperature to such an extent as to cause no practical hindrance and reduce the potential energy of the batteries as much as possible at the time of development of the fuse effect.

The present invention will be explained in more detail by the following examples. In the examples, parts are all by weight.

Test methods for the properties shown in examples are as follows:

(1) Film thickness: This was measured using a dial gauge (PEACOCK No.25 manufactured by Ozaki Seisakusho Co., Ltd.).

(2) Porosity: A sample of a square of 20 cm×20 cm was cut out from the microporous film. The volume and weight thereof were obtained and porosity was calculated using the following equation.

$$\text{Porosity}(\%) = 100 \times (\text{volume}(cm^3) - \text{weight}(g)/0.95)/\text{volume}$$

(3) Penetration strength: A penetration test was conducted using a KES-G5 handy compression tester manufactured by Kato Teck Co., Ltd. with a needle having a tip curvature radius of 0.5 mm at a penetration speed of 2 mm/sec. The maximum penetration load was employed as penetration strength (g). This was multiplied by the value of penetration strength 25($\mu$m)/film thickness($\mu$m) to obtain a penetration strength in terms of 25 $\mu$.

(4) Gas permeability: This was measured by a Gurley gas permeability tester which is based upon JIS P-8117. The gas permeability was multiplied by the value of 25($\mu$m)/film thickness($\mu$m) to obtain a gas permeability in terms of 25 $\mu$.

(5) Pore diameter:
1) SEM method: The pore diameter was measured using a scanning electron microscope.
2) Gas permeation method: The pore diameter of the microporous film can be calculated using the following equation from porosity and gas permeability by supposing Knudsen flow in the measurement of the gas permeability.

Pore diameter ($\mu$m)=189×$\tau^2$/{porosity(%)×gas permeability in terms of 25 $\mu$(sec)} Hereupon, the flexural rate $\tau$ of the pores is 2.0 for all microporous films.

(6) Terminal vinyl group concentration: Thickness of the polyethylene microporous film was adjusted to about 1 mm by a hot press. Then, the terminal vinyl group concentration, namely, the number of terminal vinyl groups per 10,000 carbon atoms in the polyethylene (hereinafter expressed by "the number/10,000 C") was calculated by the following equation using absorbance at 910 cm$^{-1}$ measured by an infrared spectro photometer (FT/IR-5300 manufactured by Nihon Denshi Co., ltd.), density (g/cm$^3$) of polyethylene and thickness (mm) of the sample.

Terminal vinyl group concentration (The number/10000C)=11.4× absorbance/(density·thickness).

(7) Fuse temperature: An electrolyte was prepared by adding lithium borofluoride to a mixed solvent of propylene carbonate and butyrolactone (volume ratio=1:1) so that the concentration of lithium borofluoride was 1.0 M. A polyethylene microporous film cut into a circle of 16 mm in diameter was impregnated with the electrolyte. This film was interposed between two nickel electrodes under a pressure of 20 kg/cm$^2$ and heated at a heating rate of 20° C./min from room temperature, and the change in impedance was measured under the conditions of 1 V and 1 kHz. The temperature at which the impedance reached 1000 $\Omega$ in this measurement was taken as the fuse temperature.

(8) Washer test: A polyethylene microporous film was interposed between two washers made of SUS having an inner diameter of 13 mm and an outer diameter of 25 mm, and four points at the circumference of the film were fixed by clips. Then, the film was dipped in a silicone oil (KF-96-10CS manufactured by Shin-Etsu Chemical Co., Ltd.) at 160° C., and when the film was broken in 20 seconds after dipping, this was evaluated to be X and when the film was not broken in 20 seconds, this was evaluated to be ◯ by visual observation.

(9) Overcharge test: LiCoO$_2$ as a positive electrode active material, graphite and acetylene black as conductive agents, and fluororubber as a binder were mixed at a weight ratio of LiCoO$_2$:graphite:acetylene black:fluororubber= 88:7.5:2.5:2. The mixture was mixed with dimethylformamide to prepare a paste. This paste was coated on an Al foil and dried to obtain a sheet, which was used as a positive electrode. Needle coke and fluororubber were mixed at a weight ratio of 95:5, and the mixture was mixed with dimethylformamide to prepare a paste. This paste was coated on a Cu foil and dried to obtain a sheet, which was used as a negative electrode. An electrolyte was prepared by adding lithium borofluoride to a mixed solvent of propylene carbonate and butyrolactone (volume ratio=1:1) at a concentration of lithium borofluoride of 1.0 M. A lithium ion battery was produced using the positive electrode, the negative electrode and the electrolyte. This battery was charged at 4.2 V for 5 hours, and was further overcharged with a constant current. The inner temperature of the battery rose by the overcharging and when the inner temperature reached the fuse temperature of the sample, current was broken. When the current was not restored after a lapse of 10 minutes, this was evaluated to be ◯. Since this test was an accelerated test, safety devices such as a PTC device which are mounted in actual batteries were removed from the batteries tested.

EXAMPLE 1 (The present invention)

40 parts of P-HDPE having a terminal vinyl group concentration of 10/10000C and a weight-average molecular weight of 420,000, 60 parts of paraffin oil (P350P manufactured by Matsumura Sekiyu Kenkyujo) and 0.5 part of a heat stabilizer (Irganox 245 manufactured by Ciba-Geigy Corp.) were kneaded by a batch type melt kneader (Laboplastomill manufactured by Toyo Seiki Co., Ltd.) at 200° C. and 50 rpm for 10 minutes. The resulting kneaded product was molded by a hot press of 200° C. and cooled by a water-cooling brace to obtain a raw film 1000 $\mu$m thick. This was stretched to 6×6 times at 120° C. by a simultaneous biaxial stretching machine (manufactured by Toyo Seiki Co., Ltd.), and thereafter the paraffin oil was removed by extraction with methylene chloride. Properties of the resulting polyethylene microporous film are shown in Table 1.

EXAMPLE 2 (The present invention)

A polyethylene microporous film was produced in the same manner as in Example 1, except that 40 parts of Sholex 5521H (manufactured by Showa Denko Co., Ltd.) having a terminal vinyl group concentration of 8/10000C and 60 parts of paraffin oil (P350P manufactured by Matsumura Sekiyu Kenkyujo) were used and stretching of the raw film was carried out at 125° C. Properties of the resulting polyethylene microporous film are shown in Table 1.

EXAMPLE 3 (The present invention)

A polyethylene microporous film was produced in the same manner as in Example 1, except that 20 parts of P-HDPE having a terminal vinyl group concentration of 10/10000C and a weight-average molecular weight of 420,000, 20 parts of Z-HDPE having a terminal vinyl group concentration of 1/10000C and a weight-average molecular weight of 250,000 and 60 parts of paraffin oil (P350P manufactured by Matsumura Sekiyu Kenkyujo) were used, and the stretching of the raw film was carried out at 125° C. Properties of the resulting polyethylene microporous film are shown in Table 1.

EXAMPLE 4 (The present invention)

A polyethylene microporous film was produced in the same manner as in Example 1, except that 12 parts of P-HDPE having a terminal vinyl group concentration of 10/10000C and a weight-average molecular weight of 420,000, 28 parts of Z-HDPE having a terminal vinyl group concentration of 1/10000C and a weight-average molecular weight of 250,000 and 60 parts of paraffin oil (P350P manufactured by Matsumura Sekiyu Kenkyujo) were used, and the stretching of the raw film was carried out at 125° C. Properties of the resulting polyethylene microporous film are shown in Table 1.

EXAMPLE 5 (The present invention)

A polyethylene microporous film was produced in the same manner as in Example 1, except that 8 parts of P-HDPE having a terminal vinyl group concentration of 10/10000C and a weight-average molecular weight of 420,000, 32 parts of Z-HDPE having a terminal vinyl group concentration of 1/10000C and a weight-average molecular weight of 250,000 and 60 parts of paraffin oil (P350P manufactured by Matsumura Sekiyu Kenkyujo) were used, and the stretching of the raw film was carried out at 125° C. Properties of the resulting polyethylene microporous film are shown in Table 1.

EXAMPLE 6 (The present invention)

A polyethylene microporous film was produced in the same manner as in Example 1, except that 40 parts of P-HDPE having a terminal vinyl group concentration of 11/10000C, a weight-average molecular weight of 420,000 and a propylene content of 0.5%, and 60 parts of paraffin oil (P350P manufactured by Matsumura Sekiyu Kenkyujo) were used, and the stretching of the raw film was carried out at 125° C. Properties of the resulting polyethylene microporous film are shown in Table 1.

EXAMPLE 7 (Comparative)

A polyethylene microporous film was produced in the same manner as in Example 1, except that 40 parts of Z-HDPE having a terminal vinyl group concentration of 1/10000C and a weight-average molecular weight of 250,000 and 60 parts of paraffin oil (P350P manufactured by Matsumura Sekiyu Kenkyujo) were used. Properties of the resulting polyethylene microporous film are shown in Table 2.

EXAMPLE 8 (Comparative)

A polyethylene microporous film was produced in the same manner as in Example 1, except that 40 parts of Z-HDPE having a terminal vinyl group concentration of 1/10000C and a weight-average molecular weight of 2,000,000 and 60 parts of paraffin oil (P350P manufactured by Matsumura Sekiyu Kenkyujo) were used. Properties of the resulting polyethylene microporous film are shown in Table 2.

EXAMPLE 9 (The present invention)

40 parts of Sholex 5521H (manufactured by Showa Denko Co., Ltd.) having a terminal vinyl group concentration of 8/10000C, 60 parts of paraffin oil (P350P manufactured by Matsumura Sekiyu Kenkyujo), and 0.1 part of an antioxidant (Irganox 245 manufactured by Ciba-Geigy Corp.) were kneaded at 200° C. using a twin-screw extruder of 35 mm. The resulting kneaded product was cast on a cooling roll adjusted to 30° C. from a hanger coat die having a lip distance of 1550 μm to make a raw film 1550 μm thick. This raw film was continuously stretched to 7×7 times at 120° C. by a simultaneous biaxial stretching machine, and then the paraffin oil was removed by extraction with methylene chloride to obtain a continuous film. A lithium ion battery was produced using the film and subjected to an overcharge test. The results are shown in Table 3.

EXAMPLE 10 (Comparative)

A continuous film was produced in the same manner as in Example 9, except that 40 parts of Z-HDPE having a terminal vinyl group concentration of 1/10000C and a weight-average molecular weight of 250,000 was used. The results are shown in Table 3.

EXAMPLE 11 (Comparative)

A continuous film was produced in the same manner as in Example 9, except that 15 parts of Z-HDPE having a terminal vinyl group concentration of 1/10000C and a weight-average molecular weight of 250,000, 5 parts of Z-HDPE having a terminal vinyl group concentration of 1/10000C and a weight-average molecular weight of 2,000,000, and 60 parts of paraffin oil (P350P manufactured by Matsumura Sekiyu Kenkyujo) were used. The results are shown in Table 3.

TABLE 1

|  | Example 1 (The present invention) | Example 2 (The present invention) | Example 3 (The present invention) | Example 4 (The present invention) | Example 5 (The present invention) | Example 6 (The present invention) |
|---|---|---|---|---|---|---|
| Film thickness (μm) | 26 | 22 | 24 | 25 | 24 | 23 |
| Porosity (%) | 41 | 32 | 30 | 45 | 47 | 42 |
| Pore diameter (μm) |  |  |  |  |  |  |
| SEM method | 0.01 | 0.01 | 0.01 | — | — | — |
| Gas permeation method | 0.027 | 0.026 | 0.019 | 0.041 | 0.043 | 0.028 |
| Penetration strength (g/25μ) | 450 | 550 | 510 | 300 | 300 | 430 |
| Gas permeability (sec/25μ) | 670 | 910 | 1330 | 410 | 370 | 640 |
| Fuse temperature (° C.) | 131 | 133 | 133 | 135 | 136 | 132 |
| Terminal vinyl group concentration | 10 | 8 | 6 | 4 | 3 | 11 |
| Washer test | ○ | ○ | ○ | ○ | ○ | ○ |

TABLE 2

|  | Example 7 (Comparative) | Example 8 (Comparative) |
|---|---|---|
| Film thickness (μm) | 22 | 26 |
| Porosity (%) | 45 | 38 |
| Pore diameter (μm) |  |  |
| SEM method | 0.01 | 0.01 |
| Gas permeation method | 0.037 | 0.023 |
| Penetration strength (g/25μ) | 520 | 1010 |
| Gas permeability (sec/25μ) | 450 | 870 |
| Fuse temperature (° C.) | 137 | 150 |
| Terminal vinyl group concentration | 1 | 1 |
| Washer test | X | X |

TABLE 3

| | Example 9 (The present invention) | Example 10 (Comparative) | Example 11 (Comparative) |
|---|---|---|---|
| Film thickness ($\mu$m) | 26 | 29 | 20 |
| Porosity (%) | 49 | 48 | 41 |
| Pore diameter ($\mu$m) | | | |
| SEM method | 0.01 | 0.01 | 0.01 |
| Gas permeation method | 0.045 | 0.033 | 0.034 |
| Penetration strength (g/25$\mu$) | 430 | 620 | 650 |
| Gas permeability (sec/25$\mu$) | 340 | 480 | 540 |
| Fuse temperature (° C.) | 134 | 137 | 139 |
| Terminal vinyl group concentration | 10 | 1 | 1 |
| Washer test Overcharge test | ○ | X | X |
| 2A | ○ | X | X |
| 3A | ○ | X | X |

INDUSTRIAL APPLICABILITY

Since the polyethylene microporous film of the present invention has a high short resistance, when it is used as a separator of lithium ion batteries or the like, batteries improved in stability of fuse state and having a high reliability can be obtained.

What is claimed is:

1. A microporous film which comprises a high-density polyethylene or a linear copolymer polyethylene, said microporous film having:

a) a terminal vinyl group concentration of about 2 or more per 10,000 carbon atoms in the polyethylene, as measured by an infrared spectroscopic method;
    b) a density of about 0.90–0.98; and
    c) a molecular weight range of about 100,000–3,000,000.

2. The microporous film according to claim 1, wherein the terminal vinyl group concentration is 5 or more per 10,000 carbon atoms in the polyethylene.

3. The microporous film according to claim 1, wherein the terminal vinyl group concentration is 6 or more per 10,000 carbon atoms in the polyethylene.

4. The microporous film according to any one of claims 1–3, wherein the weight-average molecular weight of the high-density polyethylene or linear copolymer polyethylene is 200,000–1,000,000.

5. A separator which comprises the microporous film of any one of claims 1–3.

6. A battery which uses the separator of claim 5 as a separator.

7. The microporous film according to claim 1, wherein the copolymer contains an α-olefin unit selected from the group consisting of propylene, butene, pentene, hexene, and octene.

8. The microporous film according to claim 7, wherein the α-olefin unit is present in an amount of 4 mol % or less based upon an ethylene unit of the polyethylene, whereby a fuse temperature is lowered.

9. The microporous film according to claim 1, wherein the high density polyethylene having a terminal vinyl group having about 2 or more per 10,000 carbon atoms is blended with a high density polyethylene having a terminal vinyl group having less than about 2 per 10,000 carbon atoms, whereby an average terminal vinyl group of the film does not fall below about 2 per 10,000 carbon atoms.

* * * * *